United States Patent
Duncan

(10) Patent No.: US 7,184,201 B2
(45) Date of Patent: Feb. 27, 2007

(54) DIGITAL MICRO-MIRROR DEVICE HAVING IMPROVED CONTRAST AND METHOD FOR THE SAME

(75) Inventor: Walter M. Duncan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/980,363

(22) Filed: Nov. 2, 2004

(65) Prior Publication Data

US 2006/0092497 A1 May 4, 2006

(51) Int. Cl.
*G02F 1/00* (2006.01)
(52) U.S. Cl. .................. 359/321; 359/291; 359/290
(58) Field of Classification Search ............. 359/291, 359/290, 292, 295, 298, 223, 224, 245, 248
See application file for complete search history.

(56) References Cited

U.S. PATENT DOCUMENTS 6,282,010 B1 * 8/2001 Sulzbach et al. ........... 359/249
6,958,846 B2 * 10/2005 Huibers et al. ............. 359/291

* cited by examiner

Primary Examiner—Ricky Mack
Assistant Examiner—Tuyen Tra
(74) Attorney, Agent, or Firm—Dawn V. Stephens; W. James Brady, III; Frederick J. Telecky, Jr.

(57) ABSTRACT

According to one embodiment of the present invention, a digital micro-mirror device having improved contrast and a method for the same are provided. The digital micro-mirror device includes a plurality of current-carrying conductors on an upper surface of a substrate, each current-carrying conductor having an upper surface; a low-reflectivity metal disposed upon the upper surfaces of the current-carrying conductors; first and second micro-mirrors forming an aperture above the substrate; and wherein the low-reflectivity metal disposed upon on the upper surfaces of the current-carrying conductors reduces reflection of light received through the aperture by the current-carrying conductors.

29 Claims, 2 Drawing Sheets

DIGITAL MICRO-MIRROR DEVICE HAVING IMPROVED CONTRAST AND METHOD FOR THE SAME

TECHNICAL FIELD

This invention relates in general to optical processing devices and, more particularly, to a digital micro-mirror device having improved contrast and a method for the same.

BACKGROUND

Digital micro-mirror devices (DMD) are capable of being used in optical communication and/or projection display systems. DMDs involve an array of micro-mirrors that selectively communicate at least a portion of an optical signal or light beam by pivoting between active "on" and "off" states. To permit the micro-mirrors to pivot, each micro-mirror is attached to a hinge that is mounted on one or more support posts coupled to a CMOS substrate. Beneath the micro-mirrors and support posts the CMOS substrate used to control the movement of the micro-mirrors of the DMD. Unfortunately, when the micro-mirrors are in the "off" state, this CMOS substrate, which is optically reflective, may be exposed. As light passes between the micro-mirrors of the DMD, it may then be reflected by the surface of the substrate, resulting in an unwanted optical artifact and limiting the contrast of the DMD.

A variety of methods have been employed in an attempt to reduce the reflectivity of the CMOS substrate that makes up the substructure of the DMD to improve the DMD's contrast. Some approaches have used multilayer dielectric structures made of materials such as $SiO_2$ and TiN to cover the DMD substructure. This approach, however, is limited in its applicability due to the semiconducting nature of TiN, which may cause electrical issues such as charging and parasitic capacitance. Other approaches have employed chromium oxides over chromium or other reflective metals to form optical apertures used in some DMDs. This approach is also limited, as the use of chromium is highly restricted by environmental concerns. Finally, methods employing non-metallic elements have been limited due to the fact that non-metallic elements in exposed layers in the DMD tend to react with fluorine in the headspaces of the DMDs to form compounds having high partial pressures that can damage the DMDs.

SUMMARY OF THE INVENTION

According to one embodiment of the present invention, a digital micro-mirror device having improved contrast and a method for the same are provided. The digital micro-mirror device comprises a plurality of current-carrying conductors on an upper surface of a substrate, each current-carrying conductor having an upper surface; a low-reflectivity metal disposed upon the upper surfaces of the current-carrying conductors; and first and second micro-mirrors forming an aperture above the substrate. The low-reflectivity metal disposed upon on the upper surfaces of the current-carrying conductors reduces the reflection of light received through the aperture by the current-carrying conductors.

A technical advantage of some embodiments of the present invention includes a digital micro-mirror device having improved contrast over conventional DMDs. Rather than leaving the highly-reflective current-carrying conductors on the upper surface of the substrate exposed, particular embodiments of the present invention cover these conductors with a low-reflectivity metal that reduces the reflection of light off the superstructure of the DMD.

Another technical advantage of some embodiments of present invention is that the low-reflectivity metals used tend to form ionic compounds when exposed to the compounds in the headspace of the DMD. These ionic compounds typically have lower partial pressures than covalent compounds, lowering the risk of damage to the DMD due to excessive pressures in the headspace.

Yet another technical advantage of some embodiments of the present invention is that the low-reflectivity metal used in the DMD has a naturally low absorption coefficient, allowing the low-reflectivity metal to be used in a multilayer stack structure where the metal is at least partially transmissive. In some embodiments, these multilayer stack structures may have reflectivities even lower than those of a single-layer structure of infinite thinkness.

Other technical advantages of the present invention may be readily apparent to one skilled in the art from the following figures, descriptions, and claims Moreover, while specific advantages have been enumerated above, various embodiments may include all, some, or none of the enumerated advantages

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

Figure 1:
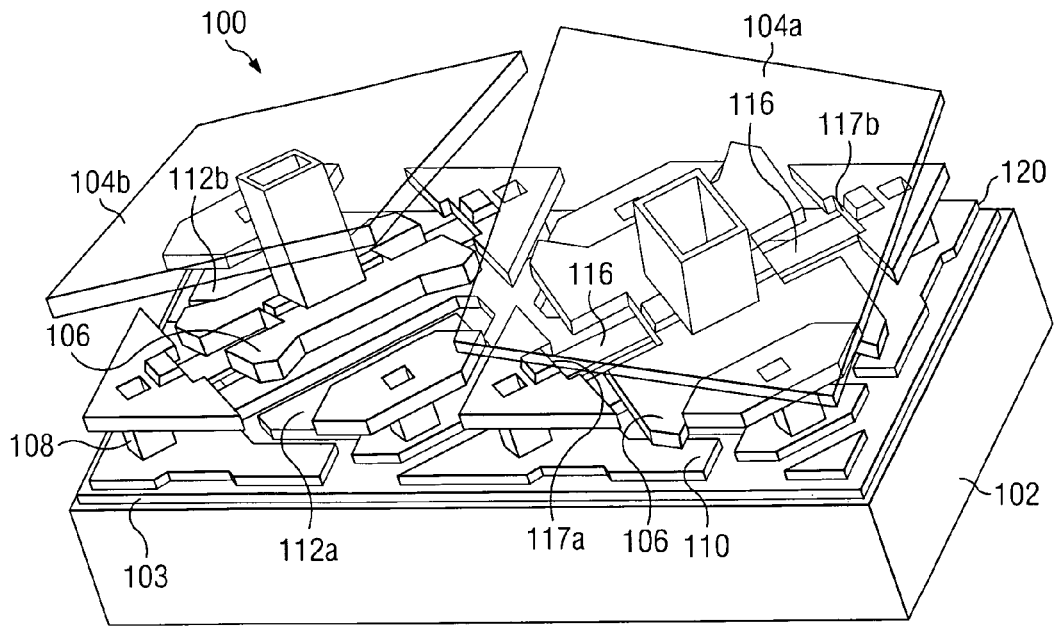
FIG. 1 illustrates a perspective view of a portion of a digital micro-mirror device in accordance with a particular embodiment of the present invention.

In accordance with a particular embodiment of the present invention, FIG. 1 illustrates a perspective view of a portion of a digital micro-mirror device (DMD) 100. DMD 100 employs a low-reflectivity coating over the conductive layer of the CMOS substrate of the DMD to reduce the reflectivity of the DMD superstructure and improve the contrast ratio of the DMD.

As shown in FIG. 1, DMD 100 comprises a micro electromechanical switching (MEMS) device that includes an array of hundreds of thousands of tilting micro-mirrors 104. In this example, each micro-mirror 104 is approximately 13.7 square microns in size and has an approximately one micron gap between adjacent micro-mirrors. In some examples, each micro-mirror can be less than thirteen square microns in size. In other examples, each micro-mirror can be approximately seventeen square microns in size. In addition, each micro-mirror 104 may tilt up to plus or minus ten degrees creating an active "on" state condition or an active "off" state condition. In other examples, each micro-mirror 104 may tilt plus or minus twelve degrees for the active "on" state or "off" state.

In this example, each micro-mirror 104 transitions between its active "on" and "off" states to selectively communicate at least a portion of an optical signal or light beam. To permit micro-mirrors 104 to tilt, each micro-mirror 104 is attached to one or more hinges 116 mounted on hinge posts 108, and spaced by means of an air gap over a complementary metal-oxide semiconductor (CMOS) substrate 102. In this example, micro-mirrors 104 tilt in the positive or negative direction until yoke 106 contacts conductive conduits 110. Although this example includes yoke 106, other examples may eliminate yoke 106. In those examples, micro-mirrors 104 tilt in the positive or negative direction until micro-mirrors 164 contact a mirror stop (not explicitly shown).

In this particular example, electrodes 112 and conductive conduits 110 are formed within a conductive layer 120 disposed outwardly from an oxide layer 103. Conductive layer 120 can comprise, for example, an aluminum alloy or other suitable conductive material. Oxide layer 103 operates to insolate CMOS substrate 102 from electrodes 112 and conductive conduits 110.

Conductive layer 120 receives a bias voltage that at least partially contributes to the creation of the electrostatic forces developed between electrodes 112, micro-mirrors 104, and/or yoke 106. In this particular example, the bias voltage comprises a steady-state voltage. That is, the bias voltage applied to conductive layer 120 remains substantially constant while DMD 100 is in operation. In this example, the bias voltage comprises approximately twenty-six volts. Although this example uses a bias voltage of twenty-six volts, other bias voltages may be used without departing from the scope of the present disclosure.

In this particular example, CMOS substrate 102 comprises the control circuitry associated with DMD 100. The control circuitry can comprise any hardware, software, firmware, or combination thereof capable of at least partially contributing to the creation of the electrostatic forces between electrodes 112, micro-mirrors 104, and/or yoke 106. The control circuitry associated with CMOS substrate 102 functions to selectively transition micro-mirrors 104 between "on" state and "off" state based at least in part on data received from a processor (not explicitly shown).

In this particular example, micro-mirror 104a is positioned in the active "on" state condition, while micro-mirror 104b is positioned in the active "off" state condition. The control circuitry transitions micro-mirrors 104 between "on" and "off" states by selectively applying a control voltage to at least one of the electrodes 112 associated with a particular micro-mirror 104. For example, to transition micro-mirror 104b to the active "on" state condition, the control circuitry removes the control voltage from electrode 112b and applies the control voltage to electrode 112a. In this example, the control voltage comprises approximately three volts. Although this example uses a control voltage of approximately three volts, other control voltages may be used without departing from the scope of the present disclosure. Furthermore, while FIG. 1 illustrates a particular DMD device, FIG. 1 and its associated description are provided for illustrative purposes only and should in no way be read to limit the scope of the present disclosure. Rather, it should recognized that the teachings of the present invention may be used to reduce the amount of light reflected by any DMD substrate or semiconductor device.

As mentioned above, when micro-mirrors 104 are in the "off" state, conductive layer 120 may be exposed as the tilting of the mirrors reveals the superstructure below the micro-mirrors. In conventional DMDs, this would result in an unwanted reflection, visible between the pixels of the optical signal or image produced by the DMD as light passed through the aperture formed by the mirrors and reflects off the superstructure of the DMD. DMD 100, however, features coating of low-reflectivity metal on the upper surface of conductive layer 120 to reduce the reflection of this light and improve the contrast ratio of the DMD. A better understanding of this may be had by looking at FIGS. 2A and 2B which illustrate examples of DMDs in accordance with the teachings of the present invention.

Figure 2A:
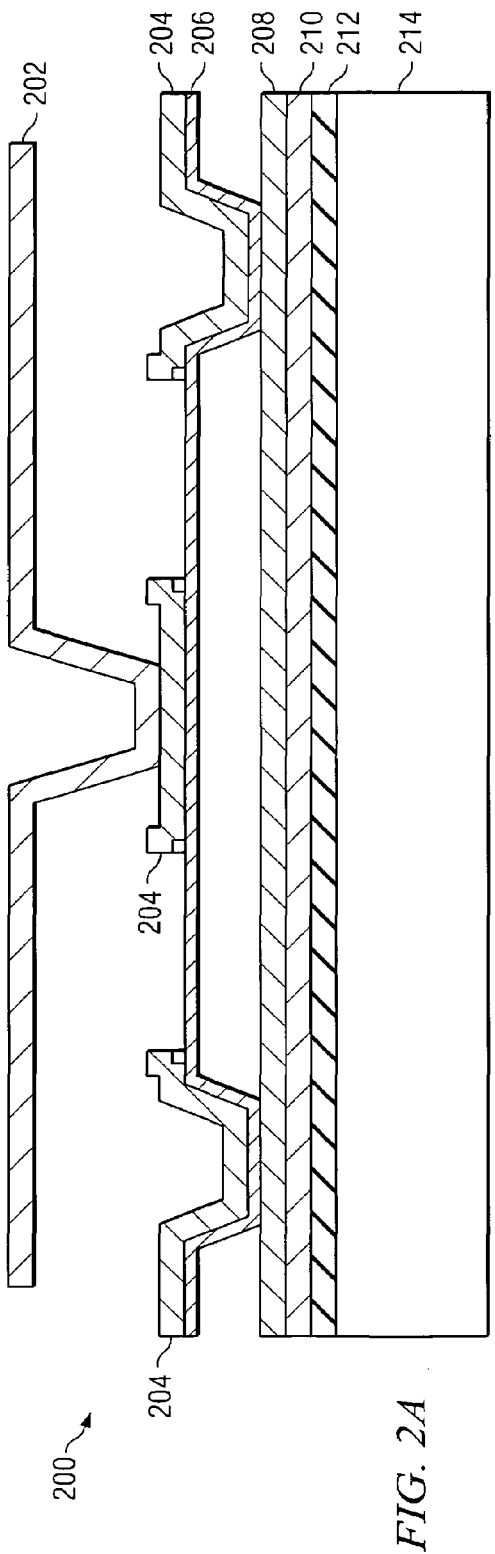
FIG. 2A illustrates a cross-sectional view of a portion of a digital micro-mirror device in accordance with a particular embodiment of the present invention.
Figure 2B:
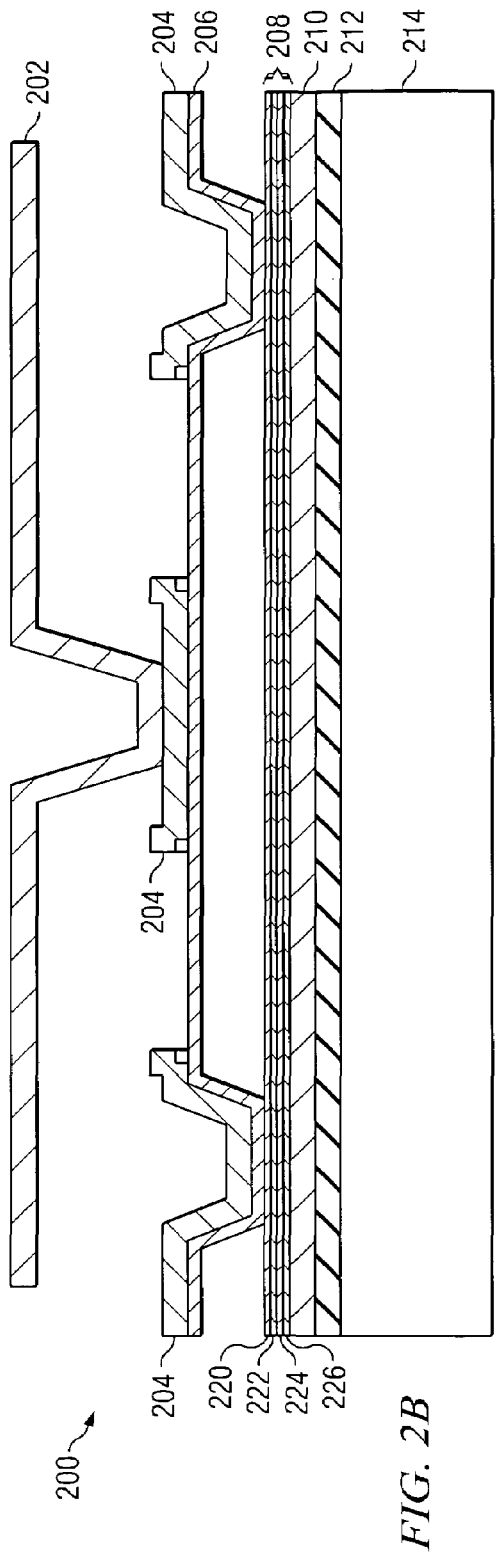
FIG. 2B illustrates a cross-sectional view of a portion of a digital micro-mirror device in accordance with a particular embodiment of the present invention.

FIG. 2A illustrates a cross-sectional view of DMD 200 in accordance with a particular embodiment of the present invention. DMD 200 comprises micro-mirror 202, which is attached to one or more beams 204 and hinges 206 and spaced by means of an air gap over a CMOS substrate 214. On the upper surface of CMOS substrate 214, a plurality of electrodes and conductive conduits (not explicity shown) are formed within a conductive layer 210 disposed outwardly from an oxide layer 212. Typically, conductive layer 210 comprises an aluminum alloy or another suitable conductive material. This tends to result in conductive layer 210 being optically reflective. To reduce the unwanted reflections off the surface of conductive layer 210, the electrodes and conductive conduits in conductive layer 210 are covered with a low-reflectivity metal in layer 208.

Generally, any low-reflectivity metal may be suitable for use in accordance with the present invention. In particular embodiments, suitable low-reflectivity metals include, but are not limited to, titanium, tungsten, vanadium, or tantalum. Generally, the low-reflectivity metals suitable for use in accordance with the teachings of the present invention have relatively low k values (also referred to as the imaginary part of the index of refraction). The relationship between the k value of the metal and the reflectivity of the metal is given by the following equation:

$$R = \left[ \frac{(n-1)^2 + k^2}{(n+1)^2 + k^2} \right]$$

where R is the reflection coefficient of the material, n is the refraction coefficient of material, and k is the extinction coefficient of material. If the k values are large in the above equation are large, the R value will approach 1. If the k values are small, however, the R value will generally remain below 1.

With that relationship in mind, low-reflectivity metals suitable for use in accordance with the teachings of the present invention typically have k values below about 3.5 for wavelengths of light from about 0.2 micrometers to about 0.8 micrometers. These low k values typically result in suitable low-reflectivity metals having reflectivities below about 0.6 for wavelengths of light from about 0.4 micrometers to about 0.7 micrometers.

The low k values of the low-reflectivity metals may also cause the low-reflectivity metal of the present invention to have a low absorption coefficient, A, given by the following equation:

$$A = \frac{4\pi k}{\lambda}$$

where A is the absorption coefficient of the material, k is the extinction coefficient of the material, and A is the wavelength of the light being absorbed.

Since the low-reflectivity metals of the present invention have low absorption coefficients, particular embodiments of the present invention may use the low-reflectivity metals as part of a multilayer stack structure. When used in such a multilayer stack, the low-reflectivity metals may be at least partially transmissive. By combining multiple thin layers of these at least partially transmissive metals, the resulting multilayer stack may have a reflectivity lower than that of an infinitely thick single-layer coating of the metal.

An example of such a multilayer stack structure is should in FIG. 2B, which again shows DMD 200. In this embodiment, however, "layer" 208 is actually a multilayer stack, comprising multiple thin layers of low-reflectivity metal, layers 220, 222, 224, and 226. In this embodiment, each of layers 220-226 may be at least partially transmissive. As discussed above, this may result in layers 220–226 having a lower overall reflectivity than a single layer of low-reflectivity metal of the same overall thickness.

The low-reflectivity metals of the present invention may also offer other benefits. For example, due to their metallic nature, the low-reflectivity metals suitable for use in accordance with the teachings of the present invention generally tend to form ionic compounds when exposed to the constituents of the headspace of DMD, which may include fluorine or phosphorous. The ionic compounds formed by the reaction of the low-reflectivity metals with the headspace constituents typically have lower partial pressures than covalently-bonded compounds. These lower partial pressures help reduce the risk of damage to the superstructure of the DMD due to excessive pressures in the headspace. Other benefits of the present invention may also be apparent to one of ordinary skill in the art.

Figure 3:
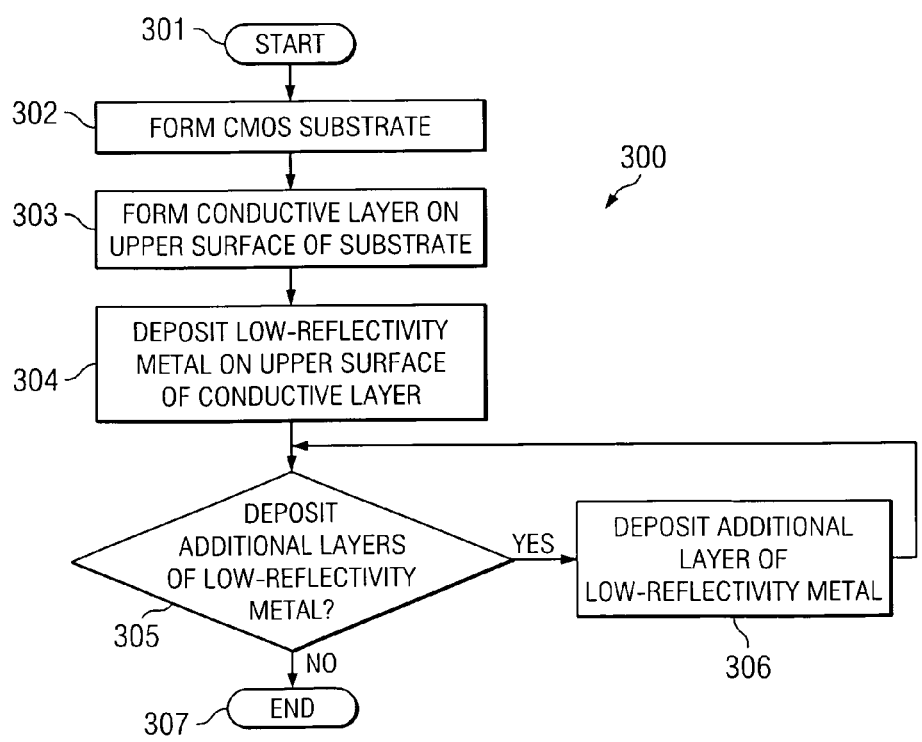
FIG. 3 illustrates a flowchart of a method of forming a digital micro-mirror device substrate in accordance with a particular embodiment of the present invention.

A flowchart of a method of improving the contrast ratio of a DMD in accordance with the teachings of the present invention is illustrated in FIG. 3. As shown in FIG. 3, flowchart 300 begins in block 301. At block 302, the CMOS substrate of the DMD is formed. Depending on the DMD being manufactured, this may comprise a variety of different materials arranged in a variety of different structures, all falling within the teachings of the present invention.

After the CMOS substrate has been formed in block 302, the conductive layer of the DMD is formed. This conductive layer comprises a plurality of electrodes and conductive conduits used to control the movement of the micro-mirrors of the DMD, and is typically comprised of aluminum alloy or another suitable conductive material.

A low-reflectivity metal, such as titanium, tungsten, vanadium, or tantalum, is then deposited on the upper surface of the conductive layer in block 303. The low-reflectivity of the metal helps reduce the reflection of light that passes between the "off" state micro-mirrors by the superstructure of DMD. Because of this reduced reflection, the resulting DMDs may have higher contrast ratios.

In particular embodiments, the low-reflectivity metal may actually be deposited as part of a multilayer stack structure. In such an embodiment, additional layers of low-reflectivity metal are required. When present in a multilayer stack, the low-reflectivity metals of the present invention are typically thin films, often being at least partially transmissive. In some embodiments, this can result in a multilayer stack having an overall reflectivity lower than that of an infinitely thick sheet of the metal. Therefore, in block 304, a determination is made of whether to deposit an optional, additional layer of low-reflectivity metal over electrodes and conduits of the conductive layer. If an additional layer of low-reflectivity metal is desired, the additional layer is deposited in block 305. Additional layers of low-reflectivity metal is added until the determination is made at block 304 that no additional layers are required. Once the desired number of layers of low-reflectivity metal are deposited, the flowchart terminates in block 307.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A digital micro-mirror device having improved contrast, comprising:
   a plurality of current-carrying conductors on an upper surface of a substrate, each current-carrying conductor having an upper surface;
   a low-reflectivity metal selected from the group consisting of titanium, tungsten, vanadium, and tantalum disposed upon the upper surfaces of the current-carrying conductors;
   first and second micro-mirrors forming an aperture above the substrate; and
   wherein the low-reflectivity metal disposed upon on the upper surfaces of the current-carrying conductors reduces reflection of light received through the aperture by the current-carrying conductors.

2. The device of claim 1, wherein the low-reflectivity metal comprises a multilayer stack structure.

3. A digital micro-mirror device having improved contrast, comprising:
   a plurality of current-carrying conductors on an upper surface of a substrate, each current-carrying conductor having an upper surface;
   a low-reflectivity metal disposed upon the upper surfaces of the current-carrying conductors;
   first and second micro-mirrors forming an aperture above the substrate; and
   wherein the low-reflectivity metal disposed upon on the upper surfaces of the current-carrying conductors reduces reflection of light received through the aperture by the current-carrying conductors.

4. The device of claim 3, wherein the low-reflectivity metal comprises titanium, tungsten, vanadium, or tantalum.

5. The device of claim 3, wherein the low-reflectivity metal has a low absorption coefficient.

6. The device of claim 3, wherein the low-reflectivity metal has a reflectivity below about 0.6 for wavelengths of light from about 0.4 micrometers to about 0.7 micrometers.

7. The device of claim 3, wherein the low-reflectivity metal has a k value below about 3.5 for wavelengths of light from about 0.2 micrometers to about 0.8 micrometers.

8. The device of claim 3, wherein the low-reflectivity metal forms an ionic compound when reacted with an element in a headspace of the digital micro-mirror device.

9. The device of claim 3, wherein the low-reflectivity metal forms a compound having a low partial pressure when reacted with an element in a headspace of the digital micro-mirror device.

10. The device of claim 3, wherein the low-reflectivity metal comprises a multilayer stack structure.

11. The device of claim 10, wherein the low-reflectivity metal is at least partially transmissive.

12. A method for improving the contrast of a digital micro-mirror device, comprising:

receiving light through an aperture formed by a first micro-mirror and a second micro-mirror positioned above a substrate of a digital micro-mirror device, the substrate having a plurality of current-carrying conductors on an upper surface of the substrate, each current-carrying conductor having a low-reflectivity metal disposed upon an upper surface of the current-carrying conductor;

allowing light received through the aperture to contact the low-reflectivity metal; and at least partially reducing the reflection of the light received through the aperture by the low-reflectivity metal.

13. The method of claim 12, wherein the low-reflectivity metal comprises titanium, tungsten, vanadium, or tantalum.

14. The method of claim 12, wherein the low-reflectivity metal has a low absorption coefficient.

15. The method of claim 12, wherein the low-reflectivity metal has a reflectivity below about 0.6 for wavelengths of light from about 0.4 micrometers to about 0.7 micrometers.

16. The method of claim 12, wherein the low-reflectivity metal has a k value below about 3.5 for wavelengths of light from about 0.2 micrometers to about 0.8 micrometers.

17. The method of claim 12, wherein the low-reflectivity metal forms an ionic compound when reacted with an element in a headspace of the digital micro-mirror device.

18. The method of claim 12, wherein the low-reflectivity metal forms a compound having a low partial pressure when reacted with an element in a headspace of the digital micro-mirror device.

19. The method of claim 12, wherein the low-reflectivity metal comprises a multilayer stack structure.

20. The method of claim 19, wherein the low-reflectivity metal is at least partially transmissive.

21. A method of forming a digital micro-mirror device structure, comprising the steps of:

forming circuitry elements at a substrate;

forming a conductive layer at selected locations of a surface of the substrate, the conductive layer comprising electrodes coupled to circuitry elements;

depositing a first layer of low-reflectivity metal over a surface of the conductive layer; and forming a tiltable mirror structure disposed over the conductive layer and first layer of low-reflectivity metal.

22. The method of claim 21, wherein the low-reflectivity metal is selected from a group consisting of titanium, tungsten, vanadium, and tantalum.

23. The method of claim 21, further comprising:

depositing a second layer of low-reflectivity metal disposed over the first layer of low-reflectivity metal.

24. The method of claim 23, wherein each of the first and second layers of low-reflectivity metal are partially transmissive.

25. The method of claim 23, wherein the low-reflectivity metal has a low absorption coefficient.

26. The method of claim 21, wherein a fluorine compound of the low-reflectivity metal is an ionic compound.

27. The method of claim 26, wherein the fluorine compound of the low-reflectivity metal exhibits a relatively low partial pressure.

28. The method of claim 21, wherein the low-reflectivity metal has a reflectivity below about 0.6 for wavelengths of light from about 0.4 micrometers to about 0.7 micrometers.

29. The method of claim 21, wherein the low-reflectivity metal has a k value below about 3.5 for wavelengths of light from about 0.2 micrometers to about 0.8 micrometers.

* * * * *